(12) United States Patent
Shaw et al.

(10) Patent No.: US 10,257,668 B2
(45) Date of Patent: Apr. 9, 2019

(54) DYNAMIC NETWORK SLICE-SWITCHING AND HANDOVER SYSTEM AND METHOD

(71) Applicant: AT&T INTELLECTUAL PROPERTY I, L.P., Atlanta, GA (US)

(72) Inventors: Venson Shaw, Kirkland, WA (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 142 days.

(21) Appl. No.: 15/590,656

(22) Filed: May 9, 2017

(65) Prior Publication Data
US 2018/0332442 A1 Nov. 15, 2018

(51) Int. Cl.
*H04L 12/24* (2006.01)
*H04W 4/08* (2009.01)
*H04L 29/08* (2006.01)
*H04W 36/06* (2009.01)
*H04L 12/721* (2013.01)
(Continued)

(52) U.S. Cl.
CPC .............. *H04W 4/08* (2013.01); *H04L 41/12* (2013.01); *H04L 45/26* (2013.01); *H04L 45/304* (2013.01); *H04L 67/1051* (2013.01); *H04W 4/70* (2018.02); *H04W 36/06* (2013.01); *H04W 76/36* (2018.02)

(58) Field of Classification Search
CPC ................................ H04L 41/12; H04L 45/26
See application file for complete search history.

(56) References Cited

U.S. PATENT DOCUMENTS 7,486,678 B1   2/2009   Devanagondi et al.
9,270,815 B2   2/2016   Shaw et al.
(Continued)

FOREIGN PATENT DOCUMENTS

WO   2017023196   2/2017
WO   2017054841   4/2017
(Continued)

OTHER PUBLICATIONS

Akyildiz, Ian, "Wireless software-defined networks (W-SDNs) and network function virtualization (NFV) for 5G cellular systems: An overview and qualitative evaluation", 2015, 14 pages.
(Continued)

*Primary Examiner* — Adnan M Mirza
(74) *Attorney, Agent, or Firm* — Guntin & Gust, PLC; Ralph Trementozzi

(57) ABSTRACT

Aspects of the subject disclosure may include, for example, accessing a service by a first network operating within a first wireless spectrum, wherein the service includes control and data forwarding operations of the first network are separate and configured to facilitate forwarding of user data via the data forwarding operations. A second network is identified operating within a second wireless spectrum. A request that the accessing of the network service be transferred to the second network is made without interrupting the forwarding of the user data. A response to the request is detected via the control operations, also without interrupting the forwarding of the user data. Responsive to an indication that the second network has been configured to accommodate a redirection of the forwarding of the user data from the first network to the second, the redirection is facilitated. Other embodiments are disclosed.

20 Claims, 8 Drawing Sheets

(51) Int. Cl.
   *H04L 12/725* (2013.01)
   *H04W 4/70* (2018.01)
   *H04W 76/36* (2018.01)

(56) References Cited

U.S. PATENT DOCUMENTS

| | | |
|---|---|---|
| 9,330,156 B2 | 5/2016 | Satapathy |
| 9,384,028 B1 | 7/2016 | Felstaine et al. |
| 2015/0063166 A1 | 3/2015 | Sif et al. |
| 2016/0094255 A1 | 3/2016 | Meredith et al. |
| 2016/0352924 A1 | 12/2016 | Senarath et al. |
| 2016/0353367 A1 | 12/2016 | Vrzic et al. |
| 2017/0079059 A1 | 3/2017 | Li et al. |
| 2017/0086049 A1 | 3/2017 | Vrzic |
| 2017/0086118 A1 | 3/2017 | Vrzic |
| 2017/0104688 A1 | 4/2017 | Mirahsan et al. |
| 2017/0141973 A1 | 5/2017 | Vrzic |
| 2017/0164349 A1 | 6/2017 | Zhu et al. |

FOREIGN PATENT DOCUMENTS

| | | |
|---|---|---|
| WO | 2017057025 A1 | 4/2017 |
| WO | 2017071228 | 5/2017 |
| WO | 2017119844 | 7/2017 |
| WO | 2017123045 A1 | 7/2017 |
| WO | 2017124003 A1 | 7/2017 |

OTHER PUBLICATIONS

Hakiri, et al., "Leveraging SDN for The 5G Networks: Trends, Prospects and Challenges", 2015, 23 pages.
Inam, et al., "Towards automated service-oriented lifecycle management for 5G networks", 2015, 8 pages.
Katsalis, et al., "5g architectural design patterns", 2016, 7 pages.

200

DYNAMIC NETWORK SLICE-SWITCHING AND HANDOVER SYSTEM AND METHOD

FIELD OF THE DISCLOSURE

The subject disclosure relates to a dynamic network slice-switching and handover system and method.

BACKGROUND

Network providers typically offer platforms for third parties to deliver services and applications to network subscribers. Communication networks enabled by technologies such as Network Function Virtualization (NFV) and Software Defined Networking (SDN), may be flexibly organized so as to serve various customer demands. In building advanced networks, such as those to support future developments in wireless networks (including next generation, or so-called Fifth Generation (5G) wireless networks), network slicing provides the ability to create different virtual networks over which different traffic flows can travel isolated from each other. For example, a network slice can include a collection of logical network functions that support a communication service requirement of a particular network service. Accordingly, different virtual networks, or slices, can support different services, different users and/or different types of user equipment (UE).

BRIEF DESCRIPTION OF THE DRAWINGS

Reference will now be made to the accompanying drawings, which are not necessarily drawn to scale, and wherein.

DETAILED DESCRIPTION

Figure 1:
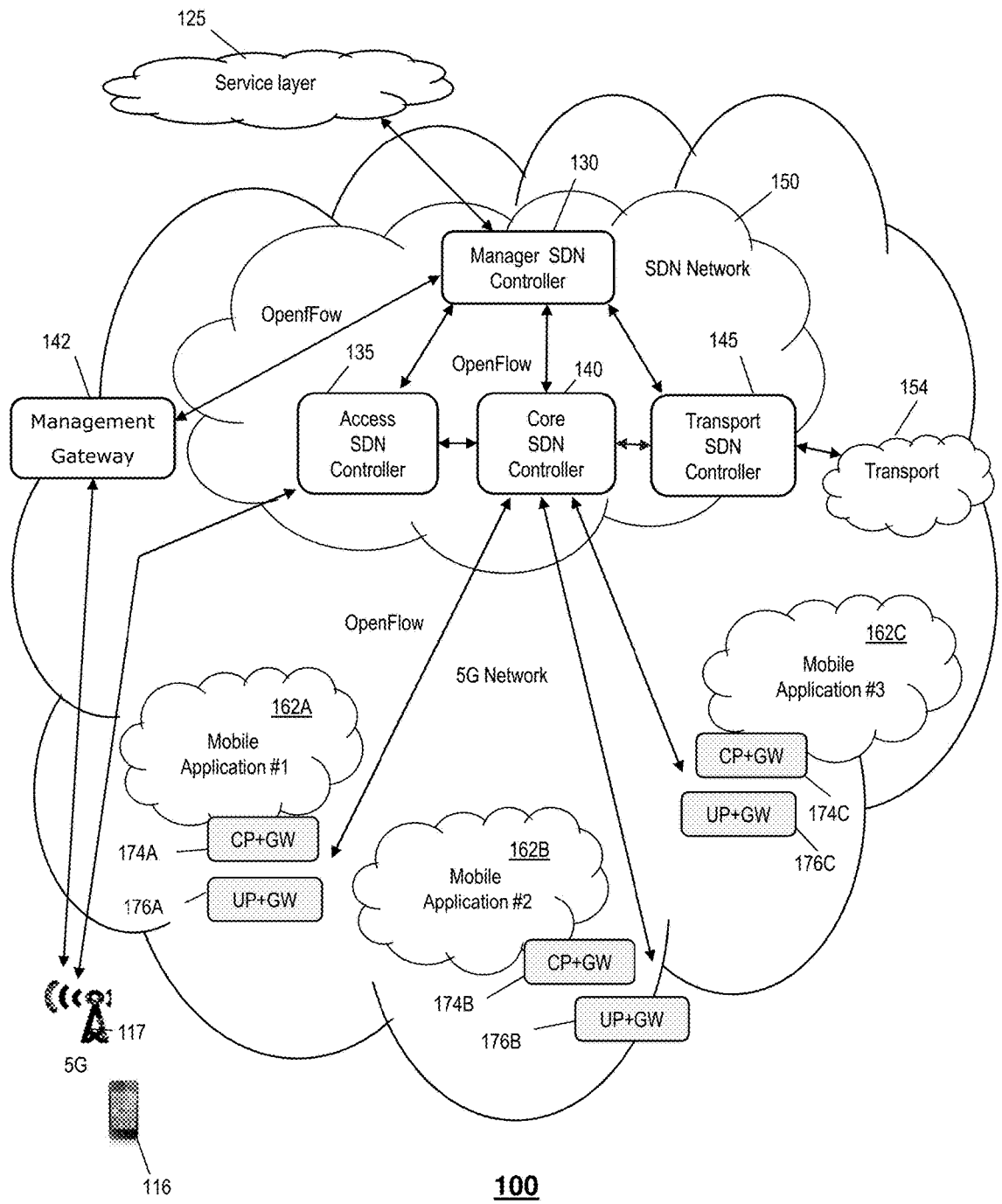
FIG. 1 depicts an illustrative embodiment of an example communication network for providing services to communication devices.

The subject disclosure describes, among other things, illustrative embodiments for using a control plane of a mobility network using a separate control plane and user plane for each mobile service and/or mobile application to set up sessions and/or logical network slices for user plane forwarding of user data during a dynamic slice switch and handover between 3GPP and non-3GPP wireless networks. Other embodiments are described in the subject disclosure.

One or more aspects of the subject disclosure include a mobile device includes a processing system having a processor and a memory that stores executable instructions. The instructions, when executed by the processing system, facilitate performance of operations, that include accessing a mobile service by a first wireless access point operating within a first radio frequency spectrum. The mobile service includes control plane operations and data plane operations of the first wireless access point, wherein the control plane operations are separate from the data plane operations and configured to facilitate a forwarding of user data via the data plane operations. A second wireless access point is identified operating within a second radio frequency spectrum, wherein the first radio frequency spectrum includes one of a managed frequency spectrum and an un-managed frequency spectrum, and wherein the second radio frequency spectrum comprises a different one of the managed frequency spectrum and the un-managed frequency spectrum. The accessing of the mobile service be transferred to the second wireless access point is requested via the control plane operations and without interrupting the forwarding of the user data via the data plane operations of the first wireless access point. A response to the request is received via the control plane operations without interrupting the forwarding of the user data via the data plane operations of the first wireless access point. Responsive to the response indicating that second wireless access point has been configured to accommodate a redirection of the forwarding of the user data via the data plane operations from the first wireless access point to the second wireless access point, the redirection of the forwarding of the user data via the data plane operations to the second wireless access point.

One or more aspects of the subject disclosure include a process that includes participating, by a processing system including processor, in a mobile service by a first portion of a wireless network operating within a first radio frequency spectrum,. The mobile service includes control operations and data forwarding operations of the first portion of the wireless network, wherein the control operations are separate from the data forwarding operations and configured to facilitate a forwarding of user data via the data forwarding operations. A second portion of the wireless network is identified, by the processing system, operating within a second radio frequency spectrum, wherein the first radio frequency spectrum comprises one of a managed frequency spectrum and an un-managed frequency spectrum, and wherein the second radio frequency spectrum comprises a different one of the managed frequency spectrum and the un-managed frequency spectrum. The participating in the mobile service is requested to be transferred to the second portion of the wireless network, wherein the request is made via the control operations and without interrupting the forwarding of the user data via the data forwarding operations of the first portion of the wireless network. A response to the request is received, by the processing system, via the control operations without interrupting the forwarding of the user data via the data forwarding operations of the first portion of the wireless network. Responsive to the response indicating that second portion of the wireless network has been configured to accommodate a redirection of the forwarding of the user data via the data forwarding operations from the first portion of the wireless network to the second portion of the wireless network, the redirection of the forwarding of the user data is facilitated, by the processing system, via the data forwarding operations to the second portion of the wireless network.

One or more aspects of the subject disclosure include a machine-readable storage device, including executable instructions that, when executed by a processing system including a processor, facilitate performance of operations.

The operations include accessing a network service by a first portion of a network operating within a first wireless spectral region, wherein the network service comprises control operations and data forwarding operations of the first portion of the network, wherein the control operations are separate from the data forwarding operations and configured to facilitate a forwarding of user data via the data forwarding operations. A second portion of the network is identified operating within a second wireless spectral region, wherein the first wireless spectral region comprises one of a managed wireless spectral region and an un-managed wireless spectral region, and wherein the second wireless spectral region comprises a different one of the managed wireless spectral region and the un-managed wireless spectral region. A request accessing of the network service be transferred to the second portion of the network is made via the control operations and without interrupting the forwarding of the user data via the data forwarding operations of the first portion of the network. A response to the request is detected via the control operations without interrupting the forwarding of the user data via the data forwarding operations of the first portion of the network. Responsive to the response indicating that second portion of the network has been configured to accommodate a redirection of the forwarding of the user data via the data forwarding operations from the first portion of the network to the second portion of the network, the redirection of the forwarding of the user data is facilitated via the data forwarding operations to the second portion of the network.

Referring now to FIG. 1, illustrative embodiments of an exemplary communication network for providing services to communication devices is shown. In one or more embodiments, a communications system 100 can include a network 150 such as a Software Defined Network (SDN), or SDN Network 150. The network 150 can be various types of networks, including networks that utilize virtualization. The SDN Network 150 can be controlled by one or more SDN Controllers. For example, the SDN network 150 can include a manager SDN controller 130, an access SDN controller 135, a Core SDN controller 140, and/or a transport SDN controller 145. The functions of the different types of SDN Controllers 130-145 are further described below. Each SDN controller, such as, for example and ease of illustration, the manager SDN controller 130, can be provided by a computing system executing computer-executable instructions and/or modules to provide various functions. In one or more embodiments, multiple computer systems or processors can provide the functionality illustrated and described herein with respect to each SDN controller 130-145. To simplify the description of the concepts and technologies described herein, each SDN controller 130-145 is illustrated and described herein as being provided by a single computing system. However, it should be understood that this example is illustrative and therefore should not be construed as being limiting in any way.

In one or more embodiments, each SDN controller 130-145 can include various components and/or can be provided via cooperation of various network devices or components. For example, each SDN controller 130-145 can include or have access various network components or resources, such as a network resource controller, network resource autonomous controller, a service resource controller, a service control interpreter, adapters, application programming interfaces, compilers, a network data collection and/or analytics engine. Each SDN controller 130-145 also can include or access information describing available resources and network information, such as network object statistics, events or alarms, topology, state changes. In one or more embodiment, each SDN controller 130-145 can use and/or can generate and/or access system configurations, including configurations of resources available to the manager SDN controller 130 for proving access to services.

In one or more embodiments, the communication system 100 can include a service-supporting portion, referred to generally as a service layer 125. The service layer 125 can provide access to services and/or applications, e.g., including third-party services and/or applications at a higher application layer. The service layer 125 may include capability servers, e.g., owned by or otherwise under the direction of an operator of the communication network 100, that can access and provide access to application layer servers, e.g., including application layer servers owned by third-party content providers via open and/or secure Application Programming Interfaces (APIs). Alternatively or in addition, the service layer 125 can provide an interface to a core portion of the network referred to generally as a core network. The communication network 100 can also include access to applications, such as fixed applications and mobile applications 162A-C.

In one or more embodiments, the communication network 100 can include an SDN network 150. The SDN network 150 can include one or more SDN controllers 130, 135, 140 and 145 that can provide different types of functions and can be arranged in virtual layers. For example, the SDN network 150 can include a manager SDN controller 130 that controls and coordinates functioning of the SDN network 150. The manager SDN controller 130 can be a top-level management system in the architecture. Below the manager SDN controller 130, a next level of SDN controllers 135, 140 and 145 can be instantiated and configured by the manager SDN controller 130 to provide specific classes of functionality in the architecture. For example, the manager SDN Controller 130 can provide level-3 functionality to control and coordinate service control, configuration, and data flow in the communication network 100. The manager SDN controller 130 can, as needed, instantiate, configure, and/or direct level-2 SDN controllers 135, 140 and 145 for controlling access, core, and/or transport capabilities in the communication network 100.

In one or more embodiments, the SDN network 150 can allow the communication network 100 to separate control plane operations from a data plane operations and can enable layer abstraction for separating service and network functions or elements from physical network functions or elements. In one or more embodiments, the manager SDN controller 130 can coordinated networking and provision of applications and/or services. The manager SDN controller 130 can manage transport functions for various layers within the communication network and access to application functions for layers above the communication network. The manager SDN controller 130 can provide a platform for network services, network control of service instantiation and management, as well as a programmable environment for resource and traffic management. The manager SDN controller 130 also can permit a combination of real time data from the service and network elements with real-time or near real-time control of a forwarding plane. In various embodiments, the manager SDN controller 130 can enable flow set up in real-time, network programmability, extensibility, standard interfaces, and/or multi-vendor support. In one embodiment, interactions between layers of the communication network 100 can be based upon policies to determine optimum configuration and rapid adaptation of the network 100 to changing state and changing customer requirements for example, predicted demand, addition of new users, spikes in traffic, planned and unplanned network outages, adding new services, and/or maintenance.

In one or more embodiments, each SDN controller 130-145 can instantiate a virtualized environment including compute, storage, and data center networking for virtual applications. For example, the manager SDN controller 130 can direct on-demand instantiation of network elements, such as Virtual Network Function (VNF) elements at on-demand locations to support network services for a customer or for the autonomous network resource controller where capacity is needed or where backup of network elements due to failures. Service functions can be moved and/or changed in response to traffic flow rather than traffic flow moving to the desired service functions.

In one or more embodiments, the manager SDN controller 130 can cooperate with a cloud orchestrator in instantiating level-2 SDN controllers 135-145 and network services to support the network configuration in connecting Virtual Machined (VMs) that the cloud orchestrator is setting up. The network instantiation and configuration can include configuration of the virtual networks, which may operate at various physical levels in a cloud server architecture, including hypervisor, top of rack, cloud network fabric, and/or IP provider edge, which can connect the cloud network with the service provider WAN network. In one or more embodiments, the level-2 SDN Controllers 135-145 can cooperate with a cloud orchestrator in instantiating VNF elements for use in, for example, the Core Network.

In one or more embodiments, a communication device 116 can operate in communication with and/or as a part of a communications network 100. The functionality of the communication device 116 may be provided by one or more server computers, desktop computers, mobile telephones, smartphones, laptop computers, set-top boxes, other computing systems, and the like. It should be understood that the functionality of the communication device 116 can be provided by a single device, by two similar devices, and/or by two or more dissimilar devices. For purposes of describing the concepts and technologies disclosed herein, the communication device 116 is described herein as a workstation or personal computer. It should be understood that this embodiment is illustrative, and should not be construed as being limiting in any way.

The communication device 116 can execute an operating system and one or more application programs. The operating system can be a computer program that controls the operation of the communication device 116. The application programs can be executable programs that are configured to execute on top of the operating system to provide various functions. According to various embodiments, the application programs can include web browsers, productivity software, messaging applications, combinations thereof, or the like. In one or more embodiments, the application programs of the communication device 116 can include applications that enable interactions between the communication device 116 and other devices or entities. In some contemplated embodiments, the application programs can provide functionality for interacting with and/or communicating with the communication network 100 and, in turn, having communications analyzed by the manager SDN controller 130 or, alternatively, any of the SDN Controllers 130-145 in the SDN network 150.

According to various embodiments, the SDN network 150 can include and/or access resources, such as a service orchestrator, a software defined network controller, a cloud orchestrator, and/or other elements. It should be understood that the manager SDN controller 130, and any of the above-described components, or combinations thereof, may be embodied as or in stand-alone devices or components thereof operating as part of or in communication with the communication network 100. As such, the illustrated embodiment should be understood as being illustrative of only some contemplated embodiments and should not be construed as being limiting in any way.

In one or more embodiments, the SDN network 150 can automatically evaluate application service requirements that have been requested from the communication system 100. In one embodiment, a service request can be received from a subscriber, or customer, or customer device. For example, a request can be receive via a portal. The service request can be provided to the soft manager SDN controller 130 for service creation, instantiation, and management. According to various embodiments, the service request can be analyzed by the manager SDN controller 130. In one embodiment, the manager SDN controller 130 can access or query the service layer 125 to determine service requirements needed for fulfilling the service request.

In one or more embodiments, a service request can be received by equipment of a subscriber or customer (e.g., via the portal), and provided to the SDN network 150 for service creation, instantiation, and management. The service request can include application objects and/or requests for particular services or functions. Thus, the service request can include objects that define service functions that are desired, requests for generation of services and/or requests for particular functionality, queries, combinations thereof, or the like. It should be understood that these examples are illustrative and therefore should not be construed as being limiting in any way. According to various embodiments, the service request can be analyzed by the SDN controller 130-145 and a set composed of a directed graph and the associated model or model files are selected. The model can define features of the service and can generate in a programming language or format such as XML, Yang models, other types of files, combinations thereof, or the like. The selected directed graph can be used at runtime to fill in the event-specific details from the API, the resource allocations per the directed graph and the resource model, and one or more state changes in the network through the adapters.

In one or more embodiments, the communication device 116 can communicate with the communication network 100 via a wireless communication link. For example, the communication device 116 can be a mobile communication device 116 that communications via a cellular communication link through a Radio Access Network (RAN) technology. A mobility network 117, such as a 3GPP wireless network, e.g., an LTE network or a 5G network, can establish wireless communications with the communication device 116, where the communication device 116 can move from cell to cell, while maintaining a communication session. In another example, the communication device 116 can communication with the communication network via a non-3GPP wireless link, e.g., a WiFi network link. The WiFi network can be, for example, a local area network (LAN) that is supported by a router capable of wireless communications or can be an individual device, such another mobile communication device 116 capable of acting as an intermediary (e.g., a Hot Spot). In one or more embodiments, the communication network 100 can be a converged network capable of supporting a wide range of access, core and transport networks, such as wireline, wireless, satellite, 3GPP, non-3GPP, and/or 5G. It is understood that the radio frequency spectrum used in wireless access can include licensed spectrum, unlicensed spectrum and combinations thereof.

In one or more embodiments, a Management Gateway (MGW) 142 can be included in the communication network 100. The MGW 142 can capture traffic entering the communication network 100 from various communication devices 116 and/or various Access Networks (AN) 117. The MGW 142 can communicate with the SDN network 150, e.g., with the manager SDN controller 130, regarding traffic entering the communication network 100. In one embodiment, the MGW 142 and the manager SDN controller 130 can communicate via a communications protocol, such as an OpenFlow® protocol that provide access to a forwarding plane of a network device, such as a switch or router, over a network. OpenFlow® is a registered trademark of the Open Networking Foundation of Palo Alto, Calif. The MGW 142 can inform the management SDN controller 130 of information regarding services sought by one or more communication devices 130. The management SDN controller 130 can analyze these services to determine service functions and/or network data flows that would be required to facilitate delivery of these services to the communication devices 116.

In one or more embodiments, the manager SDN controller 130 can query the service layer 125 to determine the functional and/or resource requirements to provide the service to the communication device 116. In one or more embodiments, the service requirements can include service feature data. In one or more embodiments, this service feature data can be generated by or provided to the service layer 125 and/or the manager SDN controller 130 via interactions between the communication device 116 and the portal. For example, in the process of making the service request, the communication device 116 can make a series of selections from menus, drop-down lists, fields, tables, or other data or object selection mechanisms that may be provided by the portal and/or the application programs executing on the communication device 116. In some embodiments, the application programs can include a web browser application and/or other application that can obtain data from the portal. In one or more embodiments, the application programs can use the data to generate and present a user interface at the communication device 116. The user interface can include possible service features, and a user or other entity can select the desired features, drag and drop desired features, and/or otherwise indicate desired features in a service.

In one or more embodiments, the manager SDN controller 130 can analyze policies or policy defined for a service. This policy can include network engineering rules, which can be defined by a network designer, engineer, business unit, operations personnel, or the like, or a subscriber policy, which can be defined during ordering of the service. Subscriber policies can include, for example, service level agreements ("SLAs"), location restrictions (e.g., locations at which the services are allowed or not allowed), bandwidth ranges, time restrictions (e.g., times of day, days of week, or other times at which the service is allowed or not allowed), security restrictions or policies, combinations thereof, or the like.

In one or more embodiments, the manager SDN controller 130 can determine from the service model one or more physical network functions or other resources that will be needed or used to support the service. The manager SDN controller 130 also can analyze the service model to identify one or more virtual network functions or other functions that will support or provide the features of the service. The manager SDN controller 130 also can determine, via analysis of the service model, process flows between the various resources and/or functions used to support or provide the service features.

In at least some embodiments, the SDN network 130 implements a multiple level, dynamic design by which the manager SDN controller 130 of the SDN network 150 can automatically prioritize and instantiate a next lower level (e.g., level-2) SDN controller including one or more of an access network SDN controller 135, a core network SDN controller 140, and/or a transport network SDN controller 145. It is understood that such actions can be undertaken on the fly, e.g., at runtime, responsive to network activity, responsive to particular requests, in a course of normal network operations, configuration, management, and the like. Generally, the manager SDN controller 130 can instantiate at least one set of these level-2 SDN controllers 135-145 to provide baseline functionality and connectivity for a least one communication device 116. As server requests are processed, the manager SDN controller 130 can evaluate the service request requirements, i.e., the service features, and compare the required resources and capacities for these resources with the resources and capacities currently available at the SDN network 150 via the level-2 SDN Controllers 135-145.

In one embodiment, the manager SDN controller 130 can communicate with each of the instantiated SDN controllers 135-145 via a communication interface, such as an interface that applies OpenFlow® data network protocols. In addition, the SDN controllers 135-145 of level-2 to can communicate among themselves to determine resource capabilities, capacities, shortages, failures, and/or warnings. In one or more embodiments, if the manager SDN controller 130 determines that the requested service can be performed, within system margins, using the currently instantiated SDN controllers 135-145, then the manager SDN controller 130 can decide to direct the SDN controllers 135-145 to perform the service for the communication device 116. Alternatively, if the manager SDN controller 130 determines a shortage or shortfall in a needed resource, then the manager SDN controller 130 can direct instantiation of one or more new SDN controller 135-145 to perform all or part of the requested service. For example, the manager SDN controller 130 may determine that the service request associated with the example communication device 116, or many communication devices 116, or merely received at the communication network 110 from an indeterminate device (e.g., a request for resources from another network) requires additional core SDN controller capacity 140. In this case, the manager SDN controller 130 can direct the instantiation of additional core SDN controller 140 capacity from a set of configurable SDN controller devices at the cloud.

In one or more embodiments, level-2 SDN Controllers 135-145, including access SDN controller 135, core SDN controller 140, and transport SDN controller 145 can control devices at an upper level, e.g., level-1, of the communication network 100. For example, the access SDN controller 135 can control, direct, configure, and monitor access resources 117 and 119 for the network 100, such as eNodeB controllers, RAN controllers, and or WiFi controllers. In another example, the core SDN controller 140 can control, direct, configure, and monitor core resources 174A-176C for the core network of the communication network 100, such as Gateways (GW) for Control Plane (CP) 174A-C, User Plane (UP) 176A-C, and/or legacy (i.e., combined user and control plane). In another example, the transport SDN controller can control, direct, configure, and monitor transport layer services 154, such as a Multiprotocol Label Switching (MPLS) network, Fiber Optics network, and/or a Backbone network.

In one or more embodiments, the manager SDN controller 130, adapted to support level-3 functionality, can manage one or more sets of level-2 SDN controllers 135-145 in the SDN network 150. The manager SDN controller 130 can configure and/or reconfigure the instantiated SDN controllers 135-145 to optimize the SDN network 150 according to loading created by the service requests. For example, the manager SDN controller 130 can invention automatically instantiate multiple levels of fully distributed SDN controllers 135-145. Likewise the level-2 SDN controllers 135-145 can instantiate and/or configure and/or reconfigure VNF elements 174A-176C at level-1. Each of the SDN controllers 130-145 can support instantiation "on the fly" based on new requests, the ending of old requests, monitoring network traffic, and/or requesting loading information from any of the other SDN controllers 135-145 and/or the VNF elements 174A-176C.

For example, the manager SDN controller 130 can instantiate and/or decommission SDN controllers 135-145 into and out from the SDN network 150 on an on-going basis according to the exchange-to-exchange (E2E) application service requirements. Similarly, the SDN controllers 135-145 can instantiated and/or decommission and/or reconfigure VNF elements 174A-176C. For example, in a streaming media application, such as a Netflix™ Video Delivery application, the manager SDN controller 130 can determine that network demands for the access SDN controller 135 and transport SDN controller 145 may be relatively large for a given set of communication devices 116, while the core SDN controller 140 demands for these communication devices 116 may be relatively normal. The manager SDN controller 130 can look at the available resources and capacities for the currently instantiated SDN controllers 135-145 that are support these communication devices 116. If the demands of the media streaming application exceed the available resources, then the manager SDN controller 130 can automatically address the issue by, for example, instantiating additional access SDN controller 135 and transport SDN controller 145 resources.

In one or more embodiments, the manager SDN controller 130 may determine that sufficient resources exist at the currently instantiated access SDN controller 135 and transport SDN controller 145 resources, however, the priorities of these resources need to be adjusted. For example, where a heavy streaming media loading is identified, the access SDN controller 135 and transport SDN controller 145 resources may be given higher priority in comparison to the core SDN controller 140. Conversely, if a heavy loading of Voice over IP (VoIP) services is identified, then the manager SDN controller 130 can automatically place the core network SDN controller 140 into higher priority in comparison to access network SDN controller 135 and transport network SDN controller 145.

In one or more embodiments, a SDN-controlled network, using network function virtualization, software defined networking, and/or cloud-based concepts, can provide flexibility in number, type and/or configuration of virtual networks, sometimes referred to as flexible network slicing. Network slicing facilitates distributed functionality, e.g., to support diverged types of services and requirements, such as those supporting future developments in wireless networks including 5G networks. SDN controllers 130 can provide control and configuration to support different network slices on appropriate network slices or clouds 162A-C by instantiating and controlling a proper sets of VNF elements 174A-176C and by the optimal distribution of these VNF elements 174A-176C based on application and service requirements.

Generally speaking, network slicing is a network management technique in which compute and/or connectivity resources in a communications network are divided to create a set of different virtual networks. For example, network slices can be supported by virtual network functions instantiated upon generic computing resources to provide specific network functions. Without limitation, network slices can be used in one or more of a core network, a radio access network, a backhaul network. Isolation provided by the network slices can be applied to different operators, different types of services, different types of network traffic, different users and/or classes of users, and the like.

In one or more embodiments, network slicing can be used by the SDN network to support multiple virtual networks behind the air interface(s) 117 of the communication network. The slicing of the network into multiple virtual networks can provide optimal support for different Radio Access Networks (RAN) and/or different service types running across a single RAN. Further, in one or more embodiments, flexible distribution of the access, edge, and core elements of the network cloud can provide optimal support regarding latency and/or service isolation for different apps and service requirements. Connectivity between computing resources can be allocated so that traffic of one slice can be isolated from that of another. Isolation can be based on one or more of network operator, service, application, user, user equipment, level of subscription service, and so on. By way of example, one slice can be configured to suit the needs of a Machine Type Communication (MTC) service, which typically generate large numbers of short transmissions that do not require ultra-reliable connections. Another slice can support Mobile Broadband (MBB), or enhanced Mobile Broadband (eMBB) services, having different requirements. Network slices created to serve the needs of different services may be built upon the resources allocated to a network operator within a slice that isolates the network operator from other network operators on a set of resources associated with a service provider.

In one or more embodiments, the SDN Network 150 can determine what service(s) is being used and which external network and/or network operator, e.g., by way of an Access Point Node (APN), is being used for the specific traffic. In one embodiment, the analysis can be performed by a SDN controller 130-145, which derive information either directly from communications entering the network 100 form one or more communication devices 116 or from a MGW 142 that is monitoring this type of traffic. In one or more embodiments, a SDN Controller 130 can perform analysis that determine a detailed granularity of the specific services being sought by or provided to the communication device 116. This detailed granularity can reveal sets of service functions (e.g., identifying servers, providing connections to applications, verifying authenticity, providing control plane and user plane functions) that are necessary for facilitating the delivery of services. The detailed granularity can also include determining various data pathways, within the network 100 and beyond, necessary for facilitating the delivery of services. The SDN Controller 130 can instantiate VNF elements 174A, 176A that can cause traffic to be sent to respective destinations such as 4G, 4G+, or 5G APNs, based upon breaking up the specific services requested into the types of service functions, resources, data accesses, and/or network data paths. The VNF elements that are composed, configured, and chained by the SDN Controller 130 for implementing the necessary service functions are, in turn, instantiated into the 5G network 100 in network locations that optimize one or more characteristics of the service functions and/or network data paths.

Examples of flexible, adaptive networks, such as the illustrative example communication network 100, are disclosed in commonly owned, U.S. patent application Ser. No. 15/344,692, entitled "Method and Apparatus for a Responsive Software Defined Network," filed on Nov. 7, 2016, and incorporated herein by reference in its entirety. Additionally, techniques related to dynamic network routing in a software defined network are disclosed in U.S. patent application Ser. No. 15/351,618, entitled "Method and Apparatus for Dynamic Network Routing in a Software Defined Network," filed on Nov. 15, 2016, and also incorporated herein by reference in its entirety.

Figure 2:
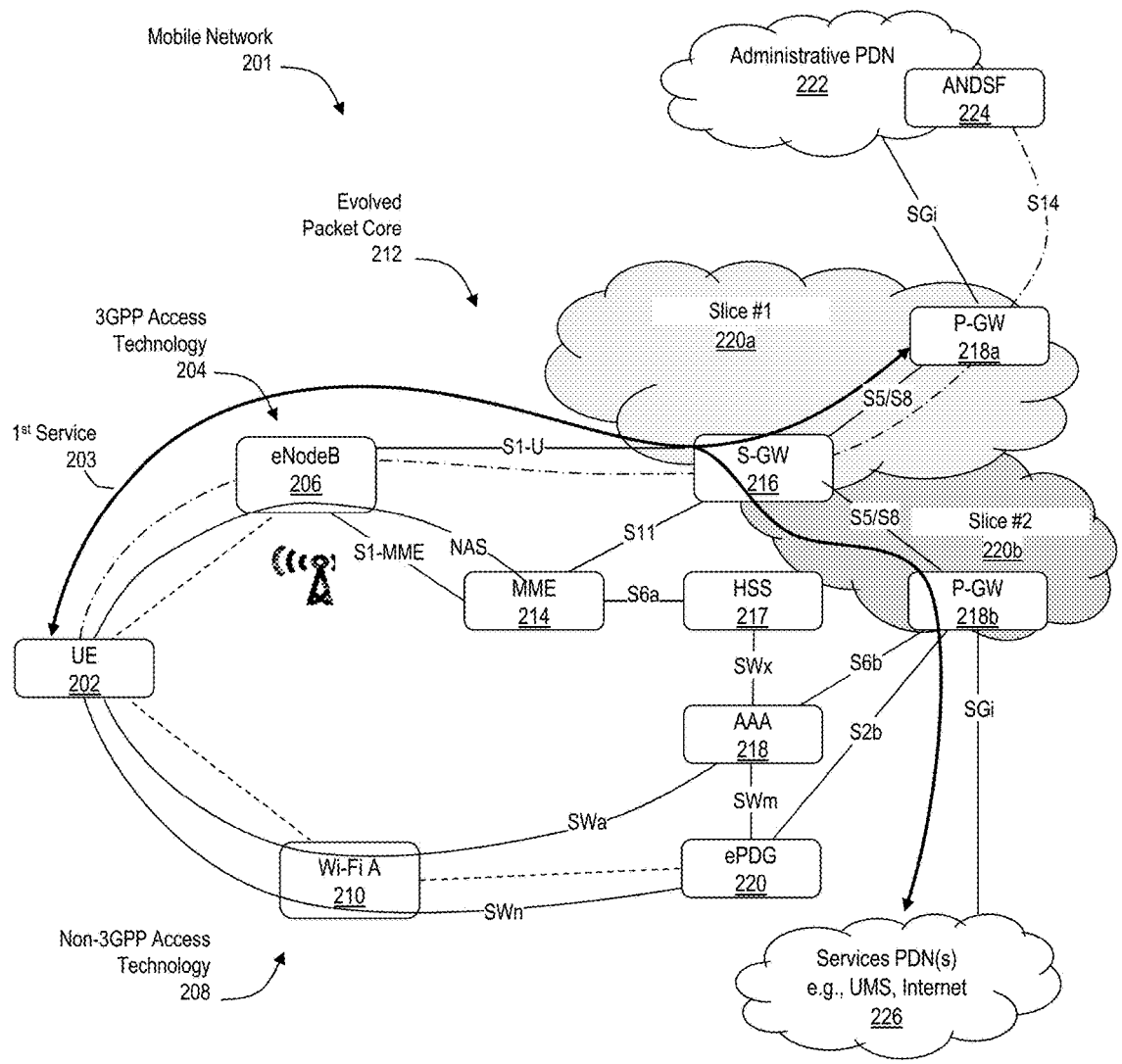
FIG. 2 depicts an illustrative embodiment of another example communication network for providing services to communication devices.

FIG. 2 depicts an illustrative embodiment of another example communication network 200 for providing services to mobile communication devices, such as user equipment (UE) 202. The UE 202 can include any mobile device capable of accessing a service via a mobile operator's network, such as mobile phones, tablet devices, laptop computers, desktop computers, electronic gaming devices, including game consoles and/or game controllers, and the like. More generally, the UE 202 can include any device configured to support Internet protocol network communications. In at least some embodiments, the UE 202 can include machine type communications, e.g., machine-to-machine communications (M2M) according to the Internet of Things (IoT), including vehicles, smart meters, residential appliances, industrial equipment, and the like.

The communication network 200 includes a mobile operator's network 201 having a first radio access network 204 and a mobile core network 212. In the illustrative example, the first radio access network 204 operates according to a 3GPP protocol, such as 2G, 3G, 4G, LTE, and/or 5G. In at least some embodiments, the first radio access network 204 operates within a managed portion of the radio frequency spectrum, which in at least some applications, can include licensed portions and/or unlicensed portions of the radio frequency spectrum.

In the illustrative embodiment, the first radio access network 204 includes an evolved Node B (eNodeB) 206. The eNodeB 206 terminates one end of a wireless radio frequency link with the UE 202. The eNodeB 206 is in communication with the core portion of the mobile service provider network 212, such as an evolved packet core, that process packet flows associated with one or more services accessed by the UE 202. In general, the UE 202 can be connected to the mobile service provider network 201 via different accesses simultaneously, e.g., sending and receiving different IP flows through different accesses. It is understood that different services can include different characteristics, e.g., in terms of QoS requirements, bandwidth, access restrictions, and/or policies.

By way of non-limiting example, services can include video telephony calls, media file synchronizations, e.g., a podcast and downloading of TV series, non-conversational video streaming, e.g., IPTV, and/or Peer-to-Peer (P2P) downloads. It us further understood that some of the packet flows of the services may be from the same application. One or more of the packet flows can be accommodated over 3GPP access, whereas, others of the one or more packet flows can be accommodated over non-3GPP access. Details related to multi access PDN connectivity and IP flow mobility are disclosed in 3GPP TR23.861, entitled "Network Based IP Flow Mobility," Rel. 13, incorporated herein by reference in its entirety.

The Evolved Packet Core (EPC) 212 can include one or more of a Mobility Management Entity (MME) 214, a Serving Gateway (S-GW) 216, first and second PDN Gateways (P-GW) 218a, 218b, generally 218, a Home Subscriber Server (HSS) 217, and an Authentication and Access Authorization (AAA) server 218. In at least 3GPP Long Term Evolution (LTE) applications, the MME 214 is involved in bearer activation/deactivation, in choosing an SGW 216 at the initial attach of the UE 202. The MME 214 also participates in authenticating a user of the UE 202, e.g., by interacting with the HSS 216, and by providing control plane functionality for mobility, e.g., between LTE, 5G, and 2G/3G access networks. The SGW 216 routes and forwards user data packets, while also acting as a mobility anchor for a user plane during inter-eNodeB handovers and as the anchor for mobility between LTE and other 3GPP technologies.

The P-GW 218 provides connectivity from the UE 202 to external packet data networks by providing a point of exit and entry of traffic for the UE 202. In the illustrative example, the external data networks include an administrative packet data network 222 and one or more services packet data networks 226. Examples of service packet data networks 226 include, without limitation, the Internet and/or other unified messaging systems, universal media services, and the like. In at least some embodiments, the UE 202 can have simultaneous connectivity with more than one PGW 218 for accessing multiple PDNs.

The HSS 217 provides a central database that contains user-related and/or subscription-related information. The HSS 216 can provide functionalities that support one or more of mobility management, call and session establishment support, user authentication and access authorization.

In general, mobile data can be carried over either 3GPP networks, non-3GPP networks or combinations thereof. The example communications network includes a second radio access path 208. The second radio access path 208 includes a non-3GPP wireless access terminal 210. It is understood that the non-3GPP wireless access terminal 210 can support wireless communications in unlicensed portions of the radio frequency spectrum. For example, a non-3GPP network 208 can include a wireless access terminal 210 according to one or more of a WiFi local area network, WIMAX, Bluetooth personal area network, and more generally any one or more of the IEEE 802.XX wireless networks.

In some embodiments, the non-3GPP access path 208 provides a trusted access path. Examples of trusted non-3GPP access paths can include a mobile carrier's own installed WiFi access points 210. In these paths, user authentication can be performed in the same or similar manner as in 3GPP network authentication, e.g., using SIM card data. Alternatively or in addition, the non-3GPP access path 308 can include non-trusted access paths. Examples of non-trusted access paths include public wireless LANs and/or domestic WiFi hotspots. Such public WiFi hotspots may connect to other packet data networks, such as the Internet without utilizing the mobile provider network 201. It is understood that in at least some embodiments, security can be assured by establishing an IPsec tunnel between the UE 202 and the ePDG 220.

The EPC 212 includes an Evolved Packet Data Gateway (ePDG) 220 gives mobile network operators the ability to deliver mobile services over untrusted, non-3GPP network access, which could include residential, public, and enterprise Wi-Fi hotspots. The ePDG 220 can provide network security and/or authentication of mobile devices 202 within the operator's network 212. Alternatively or in addition, the ePDG 220 can provide secure connections with the UE 202 over the untrusted, non-3GPP access network 208. Details of the network elements are disclosed in 3GPP TS 23.402, entitled "Architecture Enhancements for Non-3GPP Access," Rel. 12, are incorporated herein by reference in its entirety.

In some embodiments, the mobile provider network 201 includes an Access network Discover & Selection Function (ANDSF) 224. The ANDSF 224 can be configured to manage a list of access networks available in a vicinity of the UE and for storing and managing status reports from the UE 202, e.g., providing UE location and profile.

In the illustrative embodiment, the UE 202 can access a first service, including a packet flow 203 between the UE 202 and equipment of the service provider, and/or other network accessible equipment. In at least some embodiments, the service includes a packet flow 203 between the UE 202 and one or more other UEs (not shown), e.g., as in a P2P exchange, e.g., streaming audio and/or video, a VoIP call, and the like. The mobile provider network 201 can include slicing capabilities as disclosed herein, such that at least a portion of the packet flow 203 of the first service is supported by a first slice 220a that may be associated with a first mobile application used in cooperation with delivery of the service to the UE 202. The mobile provider network 201 can include one or more other slices, such as a second slice 202b. The second slice 202 can be configured to facilitate delivery of the service to the UE 202, wherein the service includes the first application and/or a second application that may be associated with the same service. In at least some embodiments, the service can be supported by either one of the slices 220a, 220b alone or in combination it is further understood that allocation and/or modification of the slices 220a, 220b can be commissioned, configured, re-configured and/or decommissioned according to the disclosure of U.S. patent application Ser. No. 15/590,648, entitled "Multi-Slicing Orchestration System and Method for Service and/or Content Delivery,", which is incorporated herein by reference in its entirety.

Figure 3A:
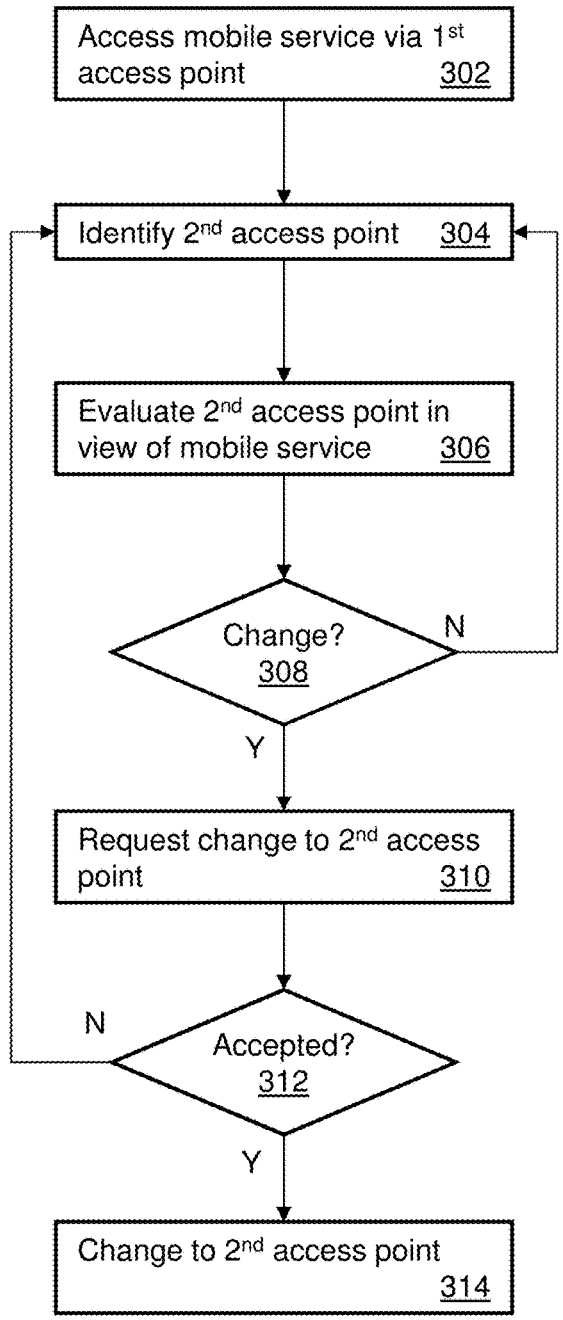
FIGS. 3A-3B depicts illustrative embodiments of processes for managing network resources used in portions of the system described in FIGS. 1 and 2.

FIG. 3A depicts an illustrative embodiment of a process 300 used in portions of the system described in FIGS. 1 and 2. The process 300 can facilitate a dynamic slice switching and/or handover between 5G 3GPP and non-3GPP networks.

The UE 202 (FIG. 2) accesses a mobile service via a first access point at 302. The mobile service includes separate packet data exchanges according to a control plane and a user plane, wherein the control plane and the user plane are associated with the mobile service. The first access point can be a 3GPP access point, such as the eNodeB 206. It is understood that any of the 3GPP access points can include 5G access points 117 (FIG. 1), e.g., in communication with a management gateway 142 a service layer network or cloud 125 and/or an SDN controller 130-145. In some embodiments, the UE 116, 202 initially attaches to the 3GPP access point 117, 206. Alternatively or in addition, the UE 116, 202 is handed over to the 3GPP access point 117, 206, e.g., based on one or more of mobility of the UE 202, a condition of the mobility network, a requirement of the service, a mobile network provider and/or user preference and so on.

Alternatively or in addition, the first access point can be a non-3GPP access point, such as the example WiFi access point 210. The non-3GPP access point can include managed and/or unmanaged non-3GPP access points 210 configured to access the ePGD 220, to support access to mobile provider network 210 services and/or third party services by way of the mobile provider network 210. Access can include authorization, e.g., by way of the AAA server 218, and identification of subscriber information available by way of the USS server 217. Similarly, the UE 116, 202 initially attaches to the non-3GPP access point 210. Alternatively or in addition, the UE 116, 202 is handed over to the non-3GPP access point 210, e.g., based on one or more of mobility of the UE 202, a condition of the mobility network, a requirement of the service, a mobile network provider and/or user preference and so on.

A second access point is identified at 304. The second access point can be identified by the UE 202. For example, the UE 202 may detect a wireless signal from the second access point by which one or more of an identity, a location, a type, a provider, a security level, a wireless access technology, and the like. Alternatively or in addition, the UE 202 can receive a message and/or similar notification from the network service provider and/or a third party that the second access point is available. For example, the network service provider can determine a location of the UE 116, 202 and/or a performance parameter of the second access point obtained by the UE and reported to the network service provider.

It is understood that identification of the second access point can include identification according to the same wireless access technology or a different wireless access technology. For example, a UE 116, 202 engaging a service by way of a 3GPP access network can identify a second, non-3GPP access network. Alternatively, the UE 116, 202 engaging a service by way of a non-3GPP access network can identify a second 3GPP access network. Non-3GPP access networks can include those managed by the mobile network provider and others not managed, e.g., public, domestic and/or enterprise WiFi.

An evaluation of the second access point is performed in view of the mobile service at 306. For example, the UE 116, 202 can determine whether a dynamic slice switching and/or a handover should be requested from the first access network to the second. Alternatively or in addition, equipment of the mobile network provider and/or a third party, such as an access management provider, can make a similar determination. Such determinations can be based on one or more of a subscription level of a user of the UE 116, 202, an equipment type of the UE 116, 202, e.g., whether the device includes the appropriate hardware, radio, antenna, and/or software, a condition of the network, e.g., congestion, delay, service outages current or planned, and the like. Alternatively or in addition, such determinations can be based on a required QoS of the engaged and/or requested service, a subscribed and/or authorized QoS of the subscriber, past performance, e.g., whether the same or similar type of UE was granted the same or similar change, e.g., in association with the same or similar service, e.g., during the same or similar network conditions, UE conditions, and so on. In at least some embodiments, such determinations can be based on mobility of the UE, whether the UE is moving, whether it is moving fast or slow, and so on.

A determination as to whether a change should be requested is made 308. In at least some embodiments, the determination can be based on any one or more of the aforementioned evaluations. Likewise, the determination can be based on a user profile, e.g., including a preference for a particular access network and/or network slice.

The UE 116, 202 requests a change to second access point at 310. The request can be forwarded from the UE 202 by way of an existing control plane and/or existing data plane packet exchange. For LTE applications, the request can be forwarded by way of the standard bearer and/or by way a dedicated bearer associated with the service. For 5G applications, the request can be forwarded by way of a default slice and/or by way of a slice allocated to the service. Alternatively or in addition, the request is forwarded to a controller of the mobile network provider and/or a third party managing slice switching and/or handovers. In at least some embodiments, the change request message is made according to a protocol that identifies the message type as being a change request. Alternatively or in addition, the change request message can be addressed to a particular network entity, such as the slice change and/or handover controller.

Equipment of the mobile network provider and/or equipment of a third party managing the slice switching and/or handovers receives the request. In at least some embodiments, the received request is evaluated to determine whether the request can or otherwise should be satisfied. The evaluation can be based on one or more of several considerations. Considerations include, without limitation, an identity of the subscriber and/or the UE device, an identity of other subscribers and/or equipment, e.g., other UE devices participating in the service, e.g., a calling party and a called party of a VoIP call, a QoS based on a subscription, a QoS requirement of the service and/or applications used by the service, network conditions, e.g., network congestion, delays, bandwidth, and so on. In at least some embodiments, the evaluation is based at least in part on an SLA of a subscriber of the requesting UE and/or subscribers of other UEs participating cooperatively in the service with the UEs, e.g., SLAs of the calling and/or called parties.

To the extent that the request is permitted, the network alone or in cooperation with equipment of a third party, such as equipment of a third party service provider providing the service and/or equipment of the third party managing slice switching and/or handovers, the alternative access network can be instantiated, accessed, configured and/or reconfigured as necessary to accommodate the request. In this regard, message are exchanged by the control plane between one or more of the requesting UE, the mobile network, any participating third party equipment and/or other UEs engaging cooperatively in the service. The network and/or third party equipment can provide a message to the requesting UE based on results of the aforementioned evaluation. In particular the related exchanging of the control plane messages can occur without interrupting user data packets or traffic associated with the service. Based on the message exchange, the second network is established and a notice sent to the requesting UE.

The requesting UE can determine whether the request has been accepted at 312, e.g., based on the received message. To the extent the change is accepted, the UE performs any reconfigurations as may be necessary to access the second network. Changes can include, without limitation, activation of another antenna and/or radio, e.g., a first antenna and/or radio used by the first access network and a second antenna and/or radio used by the second network. Once the reconfiguration has been accomplished, the UE can transfer packet exchanges, e.g., control plane and/or data plane packet exchanges to the second access network at 314.

It is understood that the process 300 can be repeated as may be necessary. For example, a request granted based on then current network conditions may be re-directed to the first access network and/or yet another access network based on a change in conditions.

To the extent that a subscription, e.g., a subscriber SLA, does not allow or permit a requested change that would be otherwise granted, the process can include steps to facilitate a change to the subscription and/or subscriber SLA. For example a change request for destination subscriber SLA can be received dynamically, e.g., during delivery of a related service. The request can occur when a calling party, either prior to a call or while talking to the called party can, receives coverage and from the HSS, calling party and/or recipient party subscriber profile identities, and/or class or types, and/or QoS classes for the calling party and/or recipient subscriber. The calling subscriber UE and/or the recipient subscriber UE can dynamically pay for a change or increase to the calling party and/or the called party SLAs and even moving the call to a superior Slice for better connection. Namely one party can request and/or pay for a change to their own SLA and/or the SLA of the other party.

That requested change to the SLA can be applied to the specific call only. Alternatively or in addition, the change to the SLA can be applied for a certain period of time, for a selective user or group of users, in association with a special event, associated with a specific location or region, during a specific time-of-the-day or time period of the day, day of the week, and/or in association with or otherwise responsive to an emergency. It is understood that SLA changes can be applied to an individual and/or a group, such as in association with a family plan, members of an enterprise network and the like.

By way of illustrative example, a reporter using her mobile UE talking to a private subscriber and can, while talking, pay for a premium service/connection in 5G network. The premium service may be used to allow for streaming video and/or high quality streaming video. Such access scenarios can be applied to situations in which the initiating or calling party, i.e., the reporter, does not have access to a secure network, or would prefer to conceal content of user data exchanges from other network carriers, other third parties, and the like.

Figure 3B:
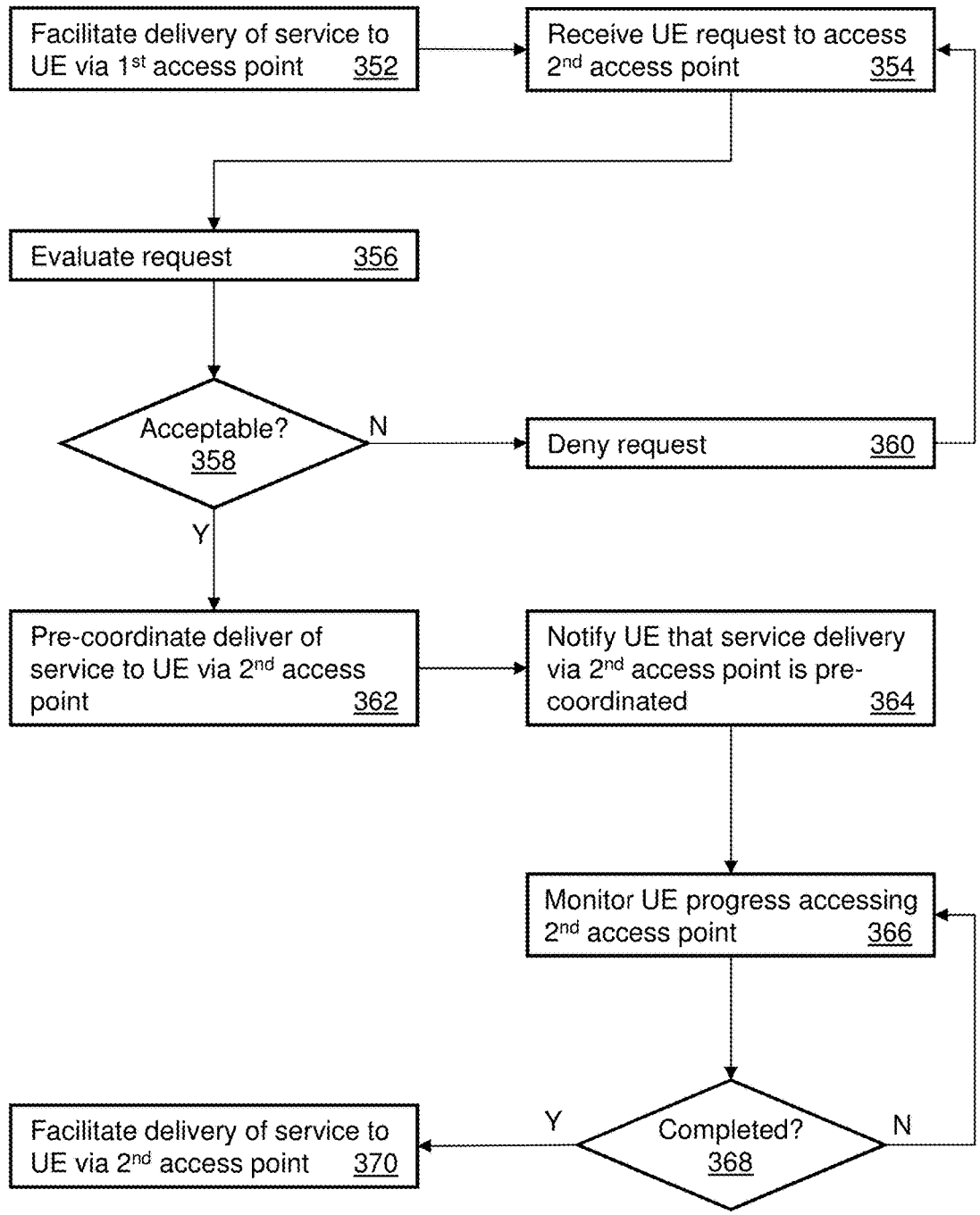

FIG. 3B depicts an illustrative embodiment of a second process 350 used in portions of the system described in FIGS. 1 and 2. The second process 350 can be applied to network equipment and/or equipment of third parties participating in slice switching and/or handovers between 3GPP and non-3GPP networks. To this end, delivery of a first service is facilitated to a UE via a first access network or first access point at 352. The service can include, without limitation, any service accessible to the UE, including any of the example services disclosed herein.

A request to provide the UE with access to a second access point is received at 354. The request can be received from the UE and/or from another device, such as another UE, a portal, another network device, equipment of a third party, and the like. The request is evaluated at 356. As disclosed above in relation to the first process 300, the request can be evaluated to determine whether it can or otherwise should be satisfied. The evaluation can be based on one or more of several considerations including, without limitation, an identity of the subscriber and/or the UE device, an identity of other subscribers and/or equipment, e.g., other UE devices participating in the service, e.g., a calling party and a called party of a VoIP call, a QoS based on a subscription, a QoS requirement of the service and/or applications used by the service, network conditions, e.g., network congestion, delays, bandwidth, and so on. In at least some embodiments, the evaluation is based at least in part on an SLA of a subscriber of the requesting UE and/or subscribers of other UEs participating cooperatively in the service with the UEs, e.g., SLAs of the calling and/or called parties A determine is made at 358 as to whether the request is acceptable. The determination can based on predetermined logic, e.g., a comparison of any of the foregoing considerations to predetermined value, threshold or range. Alternatively or in addition, the determination can be based on results of prior requests, e.g., the same or similar requests from the same or similar UE devices and/or in association with the same or similar service. For example, artificial intelligence can be applied with a goal of improving servicing of the requests. In some scenarios, a request may appear acceptable, but based on prior experiences, may be deemed unacceptable. To the extent the request is unacceptable, the request is denied at 360. Processing can continue from step 354, e.g., monitoring for and/or receiving subsequent requests at 354.

To the extent that the request is determined or otherwise deemed acceptable at 356, a pre-coordination is conducted at 362 of delivery of the service and/or related applications to UE via the second access network and/or access point. As disclosed in relation to the first process, the pre-coordination can include an exchange of one or more messages using a control plane associated with the service without interrupting a flow of user data by the separate but related user plane of the same service.

The mobile network, the service provider and/or third party can evaluate alone or in combination, whether the requested access to the second access network/point has been established and is ready to accommodate user data traffic of the service. Responsive to a determination that the second access network/point is ready, a notification is provided to the UE at 364 indicating that service delivery via second access point has been pre-coordinated.

Progress of the UE efforts to access the second access network/point is monitored at 366. For example, an indication that access has been obtained can include an exchange of a control message on a control plane via the second access network/point, indicating that the user data plane of the second access network/point is ready. A ready indication can include an indication that the second access network/point is available and ready to exchange user data traffic.

A determination as to whether a dynamic slice has been switched and/or whether the 5G 3GPP/non-3GPP handover has been completed is monitored at 368. To the extent that an indication of a successful switch/handover has not been detected at 366, the monitoring can continue at 364. It is envisioned that a number of attempts and/or time period may be applied, such that after a threshold number of attempts and/or time period has been exceeded, the processing of the request is abandoned. Such abandonment can include a reversion to the first access network/point, e.g., without having interrupted the user data traffic using the first access network/point.

To the extent that an indication of a successful switch/handover has not been detected at 366, delivery of service to UE is facilitated via second access point at 370. This can include redirection of user plane traffic and control plane traffic from the first slice and/or access network/point to the second slice and/or access network/point.

While for purposes of simplicity of explanation, the respective processes are shown and described as a series of blocks in FIGS. 3A and 3B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
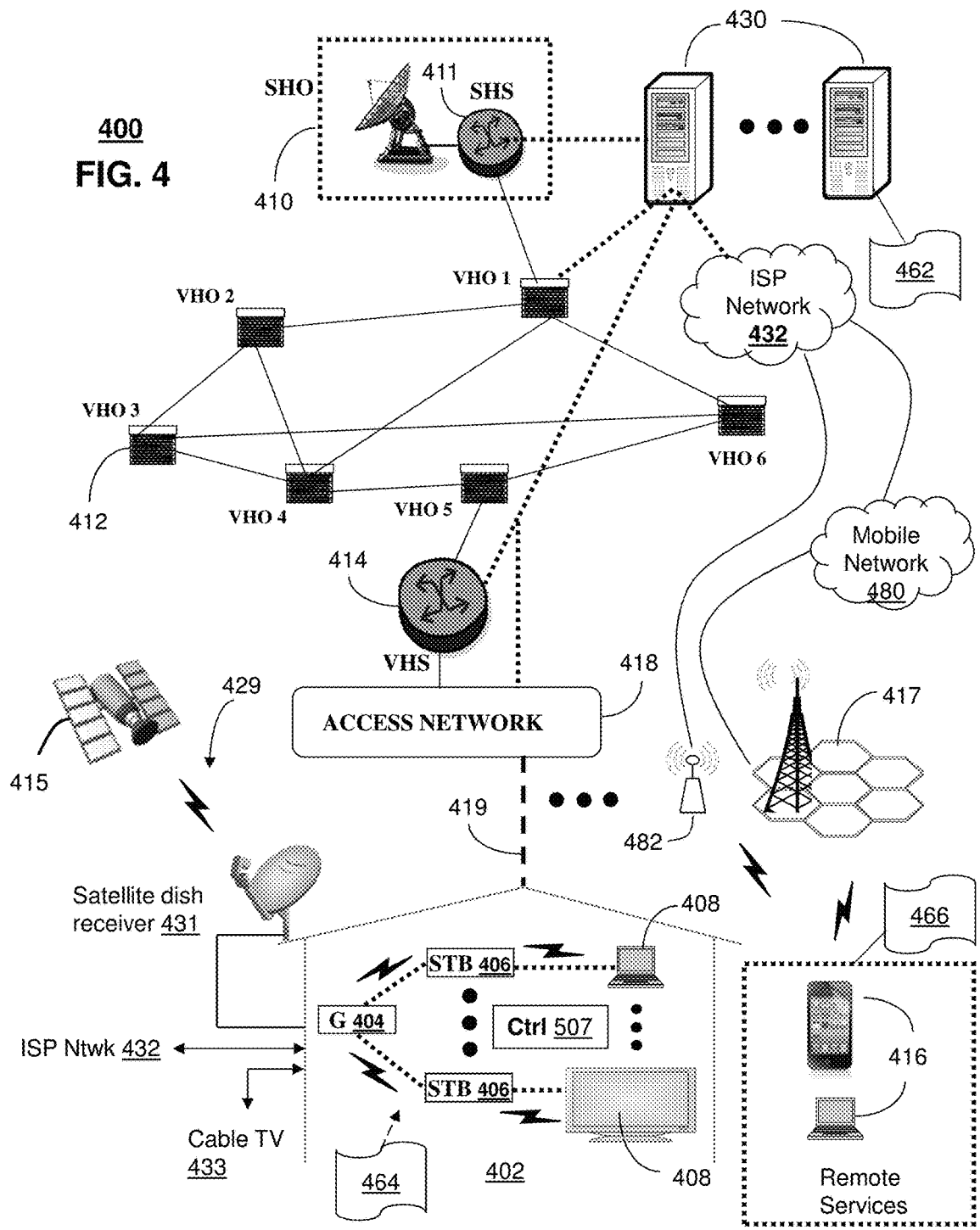
FIGS. 4-5 depict illustrative embodiments of communication systems that provide media services that can be used by the communication networks of FIGS. 1-2.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with the communication networks 100, 200 of FIGS. 1 and/or 2 as another representative embodiment of communication system 400. For instance, one or more devices illustrated in the communication system 400 of FIG. 4, accesses a service by a first network operating within a first wireless spectrum, wherein the service includes control and data forwarding operations of the first network are separate and configured to facilitate forwarding of user data via the data forwarding operations. A second network is identified operating within a second wireless spectrum. A request that the accessing of the network service be transferred to the second network is made without interrupting the forwarding of the user data. A response to the request is detected via the control operations, also without interrupting the forwarding of the user data. Responsive to an indication that the second network has been configured to accommodate a redirection of the forwarding of the user data from the first network to the second, the redirection is facilitated..

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee® or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416. In some embodiments, the wireless communication device 116 can operate in combination with a 3GPP network such as the 3GPP mobile network 480. Alternatively or in addition, the wireless communication device 116 can operate in combination with a non-3GPP network such as a WiFi access point 482. The WiFi access point 482 can include access points managed by the mobile service provider of the 3GPP mobile network 480 and/or un-managed access points 482, such as public, domestic and/or enterprise WiFi hotspots.

The communication system 400 can also provide for all or a portion of the computing devices 430 to function as a slice switching and/or 3GPP/non-3GPP handover controller (herein referred to as reconfiguration controller 430). The reconfiguration controller 430 can use computing and communication technology to perform function 462, which can include among other things, the reconfiguration techniques described by processes 300, 350 of FIGS. 3A and 3B. For instance, function 462 of the reconfiguration controller 430 can be similar to the functions described for the UE 116, the service layer cloud, 125, the SDN controllers 130-145, the management gateway 142, the administrative PDN 222, the ePDG 220, the MME 214, the S-GW 216, the P-GW 218, the HSS 217, the AAA 218, the eNodeB 206 and/or the WiFi access point 210 of FIGS. 1-2 in accordance with process 300. The media processors 406 and wireless communication devices 416 can be provisioned with software functions 464 and 465, respectively, to utilize the services of the reconfiguration controller 430. For instance, function 464 and 466 of media processors 406 and wireless communication devices 416 can be similar to the functions described for the communication devices 116, 202 of FIGS. 1-2 in accordance with the processes 300, 350 of FIGS. 3A and 3B.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
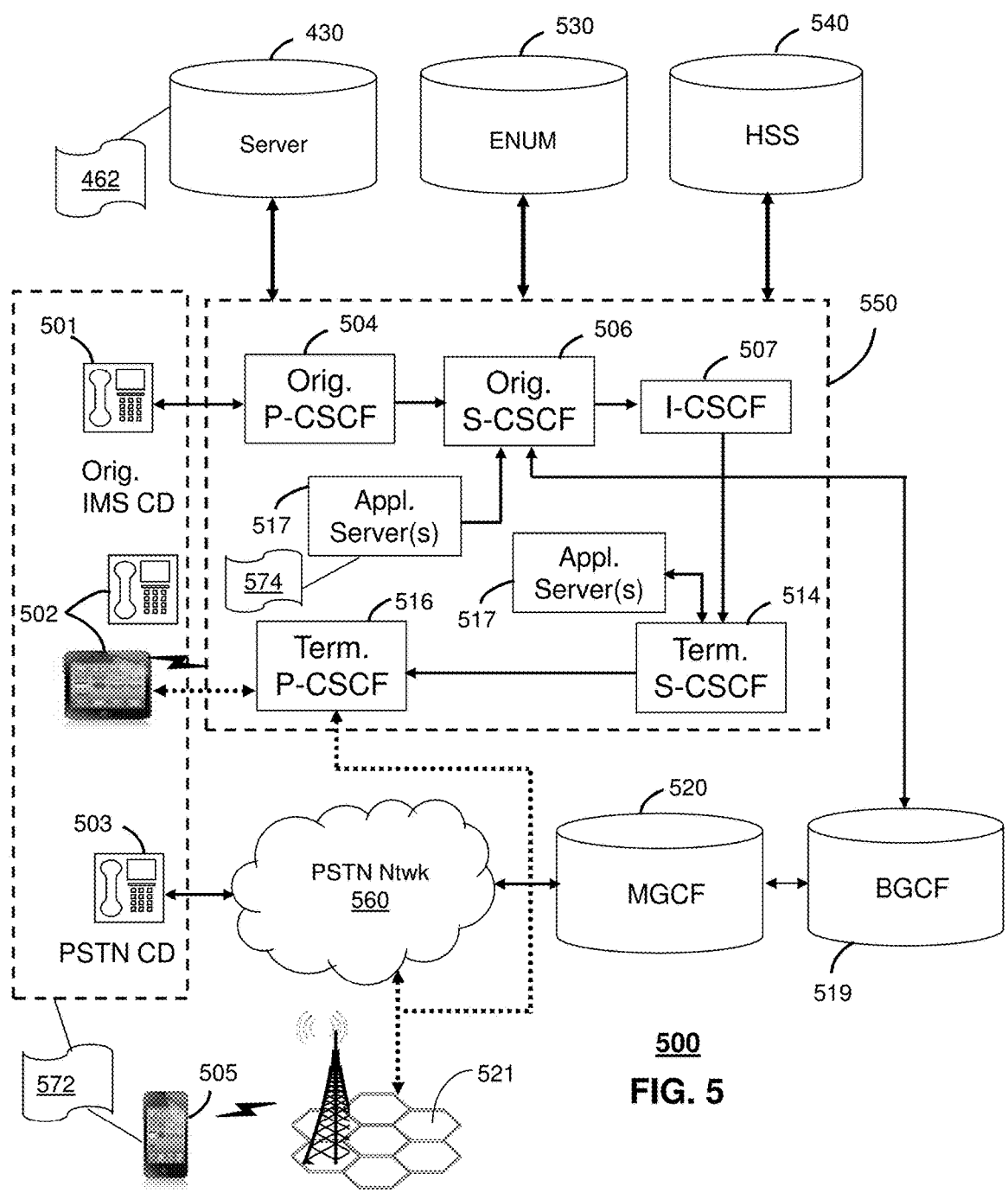

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with systems 100, 200 of FIGS. 1 and/or 2 and communication system 400 as another representative embodiment of communication system 400. A service is accessed by a first network operating within a first wireless spectrum, wherein the service includes control and data forwarding operations of the first network are separate and configured to facilitate forwarding of user data via the data forwarding operations. A second network is identified operating within a second wireless spectrum. A request that the accessing of the network service be transferred to the second network is made without interrupting the forwarding of the user data. A response to the request is detected via the control operations, also without interrupting the forwarding of the user data. Responsive to an indication that the second network has been configured to accommodate a redirection of the forwarding of the user data from the first network to the second, the redirection is facilitated.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The reconfiguration controller 430 of FIG. 4 can be operably coupled to communication system 500 for purposes similar to those described above. The reconfiguration controller 430 can perform function 462 and thereby provide slice and/or access network/point reconfiguration services to the CDs 501, 502, 503 and 505 of FIG. 5 similar to the functions described for the UE 116, the service layer cloud, 125, the SDN controllers 130-145, the management gateway 142, the administrative PDN 222, the ePDG 220, the MME 214, the S-GW 216, the P-GW 218, the HSS 217, the AAA 218, the eNodeB 206 and/or the WiFi access point 210 of FIGS. 1-2 in accordance with process 300, 350 of FIGS. 3A and 3B. CDs 501, 502, 503 and 505, which can be adapted with software to perform function 572 to utilize the services of the reconfiguration controller 430 similar to the functions described for communication devices 116, 202 of FIGS. 1-2 in accordance with the processes 300, 350 of FIGS. 3A and 3B. The reconfiguration controller 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
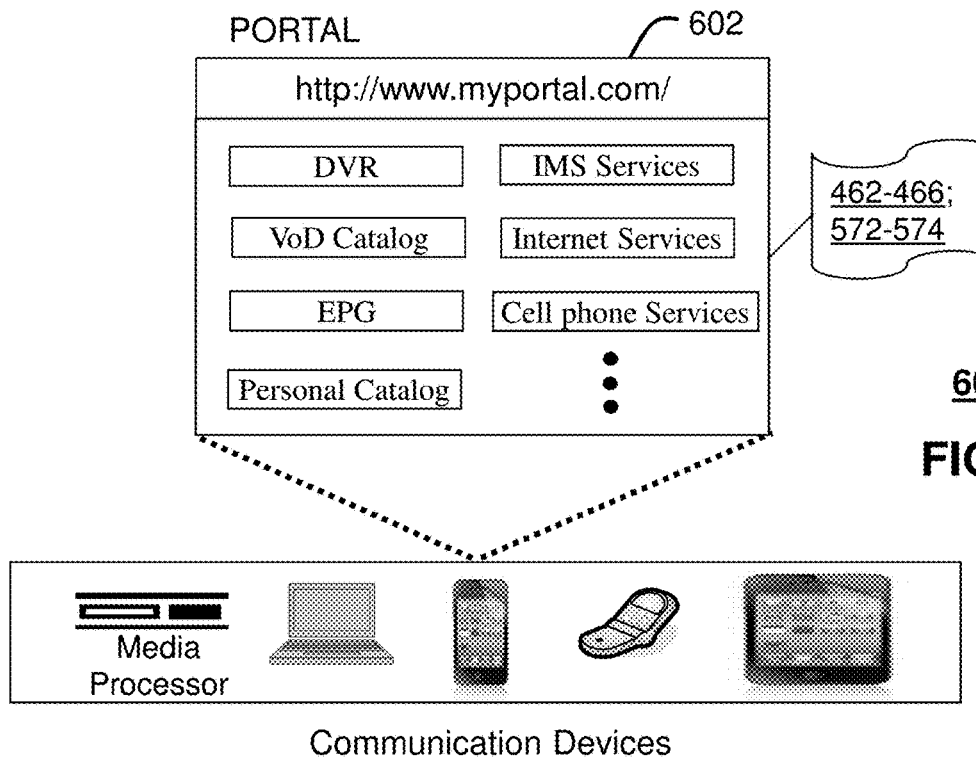
FIG. 6 depicts an illustrative embodiment of a web portal for interacting with the communication systems of FIGS. 1-2, and 4-5.

FIG. 6 depicts an illustrative embodiment of a web portal 602 of a communication system 600. Communication system 600 can be overlaid or operably coupled with systems 100-200 of FIGS. 1 and/or 2, communication system 400, and/or communication system 500 as another representative embodiment of systems 100, 200 of FIGS. 1 and/or 2, communication system 400, and/or communication system 500. The web portal 602 can be used for managing services of systems 100, 200 of FIGS. 1 and/or 2 and communication systems 400-500. A web page of the web portal 602 can be accessed by a Uniform Resource Locator (URL) with an Internet browser using an Internet-capable communication device such as those described in FIGS. 1 and/or 2 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100, 200 of FIGS. 1 and/or 2, and communication systems 400-500. For instance, users of the services provided by the reconfiguration controller 430 can log into their on-line accounts and provision the service layer 125, the SDN controller 130-145, the management gateway 142, the servers 214, 217, 218, 220, 216, 218, 224, 430, the wireless access points 116, 206, 210, 417, 482 and/or the devices 116, 202, 416 with one or more of user profiles, SLAs, logic, preferences, subscriptions, authorization data, to provide contact information to any one or more of the aforementioned devices to facilitate dynamic slice switching and/or 3GPP/non-3GPP handovers with devices described in FIGS. 1-5, and so on. Service providers can log onto an administrator account to provision, monitor and/or maintain the systems 100, 200 of FIGS. 1 and/or 2 or server 430.

Figure 7:
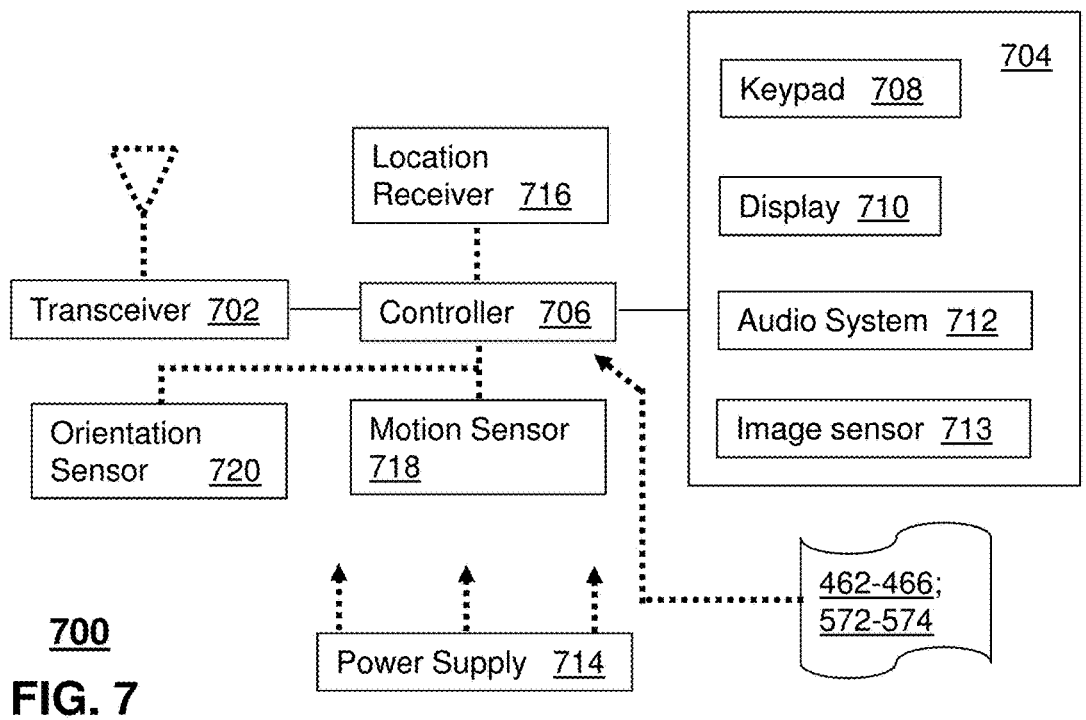
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 2, and FIGS. 4-5 and can be configured to perform at least portions of the processes 300, 350 of FIGS. 3A and 3B.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems 100, 200 of FIGS. 1 and/or 2, communication systems 400-500 of FIGS. 4-5 such as a gaming console and a media player. In addition, the controller 706 can be adapted in various embodiments to perform the functions 462-466 and 572-574, respectively.

Upon reviewing the aforementioned embodiments, it would be evident to an artisan with ordinary skill in the art that said embodiments can be modified, reduced, or enhanced without departing from the scope of the claims described below. For example, one or more of the systems and/or processes disclosed herein can provide a multi slicing on demand capability. One or more subscriber UE can submit an initial request for service within a 3GPP 5G network. The request is intercepted by a management gateway that can receive multiple initial service request from the selective subscriber UE. The management gateway forwards the initial service request to a service layer cloud, which examines each of subscriber UE requirement. Requirements can include, without limitation, service type, QoS, and subscriber type, e.g., enterprise, single sub, etc. The service layer cloud sends the command to an SDN controller and the management gateway, which evaluate the requests to determine or otherwise identify one or more logical network slice resources and availability in association with each service request. The SDN controller and the management gateway assign particular slice to each of the service requests. The SDN controller and the management gateway forward traffic, both control plane and user plane to a correct single logical network slice and/or multiple logical network slices for each of the service requests. In an event that none of the available single slices is capable to support the initial request for service, multiple slice can be assigned to simultaneously support the requested service.

Alternatively or in addition, one or more of the systems and/or processes disclosed herein can provide a dynamic multi-slicing capability, e.g., that can be invoked based on one or more of a profile and/or policy, e.g., according to a subscription level, such as a premium subscription. Alternatively or in addition, the capability can be invoked based on one or more of an emergency adaption, network capacity, e.g., network load, geographic location of the UE, service availability, and the like. It is further understood that the dynamic multi-slicing capability can be terminated and/or re-established based on profile and/or policy according to any of the foregoing parameters. In at least some embodiments, the dynamic multi-slicing capability can be pre-scheduled based o profile and/or policy according to any of the foregoing parameters. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
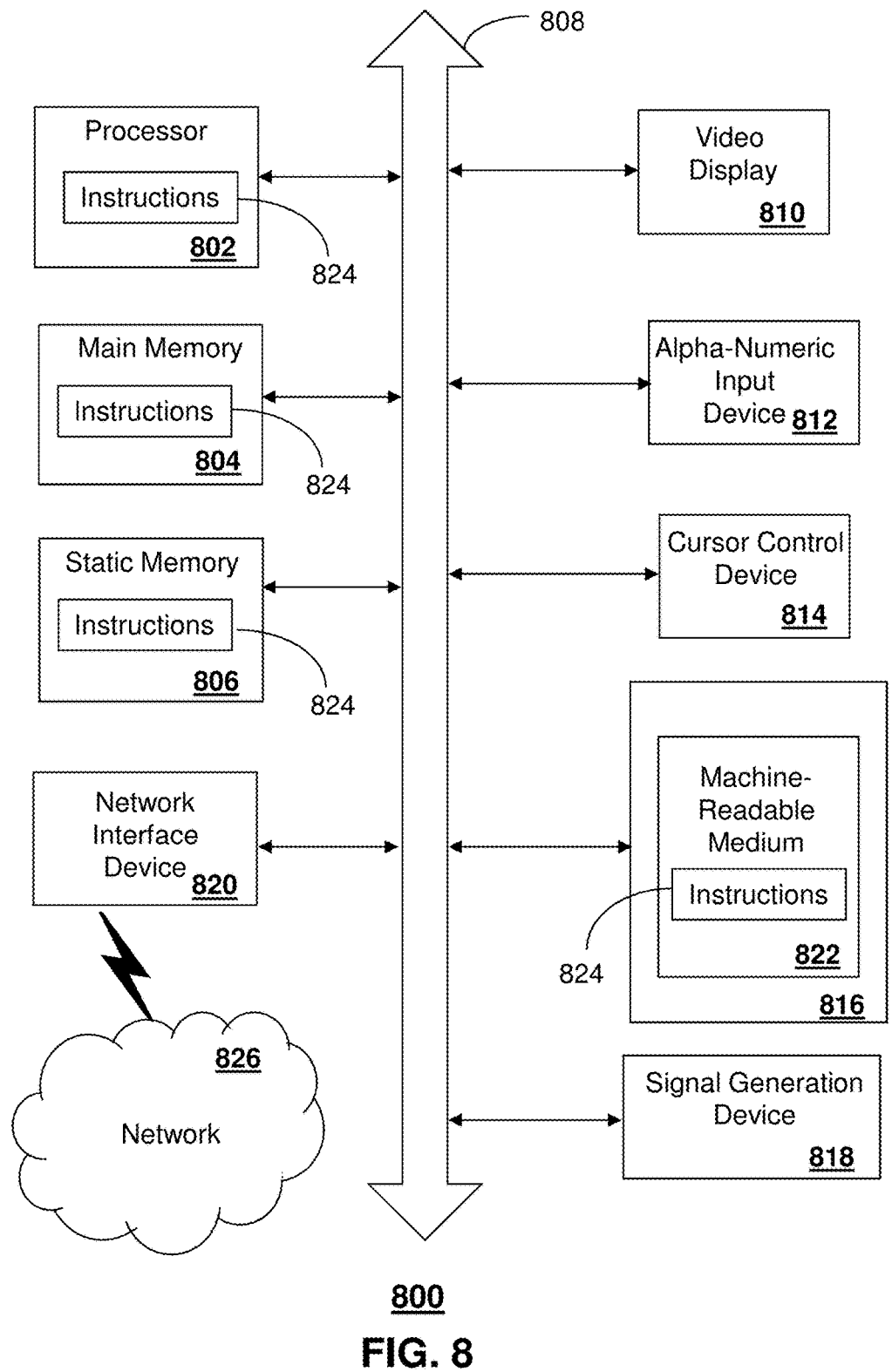
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the reconfiguration controller 430, the media processor 406, the UE 116, the service layer cloud, 125, the SDN controllers 130-145, the management gateway 142, the administrative PDN 222, the ePDG 220, the MME 214, the S-GW 216, the P-GW 218, the HSS 217, the AAA 218, the eNodeB 206 and/or the WiFi access point 210 and other devices of FIGS. 1-2 and 4-5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
a processing system including a processor; and
a memory that stores executable instructions that, when executed by the processing system, facilitate performance of operations, comprising:
accessing a mobile service by a first wireless access point operating within a first radio frequency spectrum, wherein the mobile service comprises control plane operations and data plane operations of the first wireless access point, wherein the control plane operations are separate from the data plane operations and configured to facilitate a forwarding of user data via the data plane operations;
identifying a second wireless access point operating within a second radio frequency spectrum, wherein the first radio frequency spectrum comprises one of a managed frequency spectrum and an un-managed frequency spectrum, and wherein the second radio frequency spectrum comprises a different one of the managed frequency spectrum and the un-managed frequency spectrum;
requesting, via the control plane operations and without interrupting the forwarding of the user data via the data plane operations of the first wireless access point, that the accessing of the mobile service be transferred to the second wireless access point;
receiving a response to the request via the control plane operations without interrupting the forwarding of the user data via the data plane operations of the first wireless access point; and
responsive to the response indicating that second wireless access point has been configured to accommodate a redirection of the forwarding of the user data via the data plane operations from the first wireless access point to the second wireless access point, facilitating the redirection of the forwarding of the user data via the data plane operations to the second wireless access point.

2. The mobile device of claim 1, wherein the facilitating of the redirection of the forwarding of the user data via the data plane operations to the second wireless access point further comprises a reconfiguration of the mobile device.

3. The mobile device of claim 2, wherein the reconfiguration of the mobile device comprises a reconfiguration of a radio, an antenna or both, processing wireless signals within the first radio frequency spectrum to processing wireless signals within the second radio frequency spectrum.

4. The mobile device of claim 1, wherein the redirection of the forwarding of the user data via the data plane operations from the first wireless access point to the second wireless access point further comprises redirecting control plane operations and user plane operations to a different logical network slice.

5. The mobile device of claim 1, wherein the first wireless access point operating within the first radio frequency spectrum comprises a 3GPP mobile network.

6. The mobile device of claim 5, wherein the 3GPP mobile network comprises a 5G mobile network comprising a plurality of logical network slices configurable to accommodate the control plane operations and the data plane operations.

7. The mobile device of claim 1, wherein the requesting, via the control plane operations, that the accessing of the mobile service be transferred to the second wireless access point is responsive to the identifying of the second wireless access point operating within the second radio frequency spectrum.

8. The mobile device of claim 7, wherein the identifying of the second wireless access point operating within the second radio frequency spectrum further comprises receiving a message via the control plane operations of the first wireless access point identifying the second wireless access point.

9. A method, comprising:
   participating, by a processing system including processor, in a mobile service by a first portion of a wireless network operating within a first radio frequency spectrum, wherein the mobile service comprises control operations and data forwarding operations of the first portion of the wireless network, wherein the control operations are separate from the data forwarding operations and configured to facilitate a forwarding of user data via the data forwarding operations;
   identifying, by the processing system, a second portion of the wireless network operating within a second radio frequency spectrum, wherein the first radio frequency spectrum comprises one of a managed frequency spectrum and an un-managed frequency spectrum, and wherein the second radio frequency spectrum comprises a different one of the managed frequency spectrum and the un-managed frequency spectrum;
   requesting, by the processing system, via the control operations and without interrupting the forwarding of the user data via the data forwarding operations of the first portion of the wireless network, that the participating in the mobile service be transferred to the second portion of the wireless network;
   receiving, by the processing system, a response to the request via the control operations without interrupting the forwarding of the user data via the data forwarding operations of the first portion of the wireless network; and
   responsive to the response indicating that second portion of the wireless network has been configured to accommodate a redirection of the forwarding of the user data via the data forwarding operations from the first portion of the wireless network to the second portion of the wireless network, facilitating, by the processing system, the redirection of the forwarding of the user data via the data forwarding operations to the second portion of the wireless network.

10. The method of claim 9, wherein the facilitating of the redirection of the forwarding of the user data via the data forwarding operations to the second portion of the wireless network further comprises a reconfiguration of a mobile device.

11. The method of claim 10, wherein the reconfiguration of the mobile device comprises a reconfiguration of a radio, an antenna or both, processing wireless signals within the first radio frequency spectrum to processing wireless signals within the second radio frequency spectrum.

12. The method of claim 9, wherein the first portion of the wireless network comprises a first logical network slice and the second portion of the wireless network comprises a second logical slice.

13. The method of claim 9, wherein the first portion of the wireless network operating within the first radio frequency spectrum comprises a 3GPP mobile network.

14. The method of claim 13, wherein the 3GPP mobile network comprises a 5G mobile network comprising a plurality of logical network slices configurable to accommodate the control operations and the data forwarding operations.

15. The method of claim 9, wherein the requesting, via the control operations, that the participating in the mobile service be transferred to the second portion of the wireless network is responsive to the identifying of the second portion of the wireless network operating within a second radio frequency spectrum.

16. The method of claim 15, wherein the identifying of the second portion of the wireless network operating within a second radio frequency spectrum further comprises receiving, by the processing system, a message via the control operations of the first portion of the wireless network identifying the second portion of the wireless network.

17. A machine-readable storage device, comprising executable instructions that, when executed by a processing system including a processor, facilitate performance of operations, comprising:
   accessing a network service by a first portion of a network operating within a first wireless spectral region, wherein the network service comprises control operations and data forwarding operations of the first portion of the network, wherein the control operations are separate from the data forwarding operations and configured to facilitate a forwarding of user data via the data forwarding operations;
   identifying a second portion of the network operating within a second wireless spectral region, wherein the first wireless spectral region comprises one of a managed wireless spectral region and an un-managed wireless spectral region, and wherein the second wireless spectral region comprises a different one of the managed wireless spectral region and the un-managed wireless spectral region;
   requesting via the control operations and without interrupting the forwarding of the user data via the data forwarding operations of the first portion of the network, that the accessing of the network service be transferred to the second portion of the network;
   detecting a response to the request via the control operations without interrupting the forwarding of the user data via the data forwarding operations of the first portion of the network; and
   responsive to the response indicating that second portion of the network has been configured to accommodate a redirection of the forwarding of the user data via the data forwarding operations from the first portion of the network to the second portion of the network, facilitating the redirection of the forwarding of the user data via the data forwarding operations to the second portion of the network.

18. The machine-readable storage device of claim 17, wherein the facilitating of the redirection of the forwarding of the user data via the data forwarding operations to the second portion of the network further comprises a reconfiguration of a mobile device.

19. The machine-readable storage device of claim 18, wherein the reconfiguration of the mobile device comprises a reconfiguration of a radio, an antenna or both, processing wireless signals within the first wireless spectral region to processing wireless signals within the second wireless spectral region.

20. The machine-readable storage device of claim 17, wherein the first portion of the network comprises a first logical network slice and the second portion of the network comprises a second logical slice.

* * * * *